United States Patent [19]

Rüetschi

[11] 4,136,236
[45] Jan. 23, 1979

[54] LONG-LIFE ALKALINE PRIMARY BATTERY

[75] Inventor: Paul Rüetschi, Yverdon, Switzerland

[73] Assignee: Leclanche S.A., Yverdon, Switzerland

[21] Appl. No.: 791,562

[22] Filed: Apr. 27, 1977

[30] Foreign Application Priority Data

Apr. 30, 1976 [CH] Switzerland .................. 5477/76

[51] Int. Cl.² ........................................... H01M 6/04
[52] U.S. Cl. ........................... 429/206; 429/218; 429/219; 429/222; 429/230
[58] Field of Search ............. 429/222, 230, 219, 218, 429/224, 145, 162, 209, 232, 223, 48

[56] References Cited

U.S. PATENT DOCUMENTS

| | | | |
|---|---|---|---|
| 3,178,314 | 4/1965 | Horn et al. | 429/162 X |
| 3,427,203 | 2/1969 | Fletcher | 429/230 |
| 3,485,672 | 12/1969 | Ruben | 429/145 |
| 3,673,000 | 6/1972 | Ruetschi | 429/176 |
| 3,961,985 | 6/1976 | Takamura et al. | 429/224 |
| 4,015,055 | 3/1977 | Langan et al. | 429/145 |

*Primary Examiner*—Anthony Skapars

*Attorney, Agent, or Firm*—Lockwood, Dewey, Alex & Cummings

[57] ABSTRACT

This invention relates to an alkaline primary battery of the type having a negative electrode containing cadmium or amalgamated zinc and a positive electrode containing monovalent silver oxide, mercuric oxide, or mixtures of these oxides with manganese dioxide, the positive electrode having an electrochemically active surface area facing the negative electrode. At positive electrodes, self-discharge can be caused by the solubility of the active material. It is an object of this invention to provide an improved alkaline primary battery designed to reduce this type of self-discharge, without impairing the internal resistance of the battery. To this end, in the alkaline primary battery the improvement comprises at least one electrically conductive, microporous, electrolyte-saturated, optically opaque filter-electrode which covers the entire active surface area of the positive electrode, contains either no monovalent silver oxide nor mercuric oxide or only a substantially smaller amount thereof per unit of volume than the positive electrode, contains electrically conductive material which is not corroded, oxidized, nor dissolved in alkali electrolytes at the given potential of the positive electrode, and is in electrical contact with the positive electrode.

7 Claims, 4 Drawing Figures

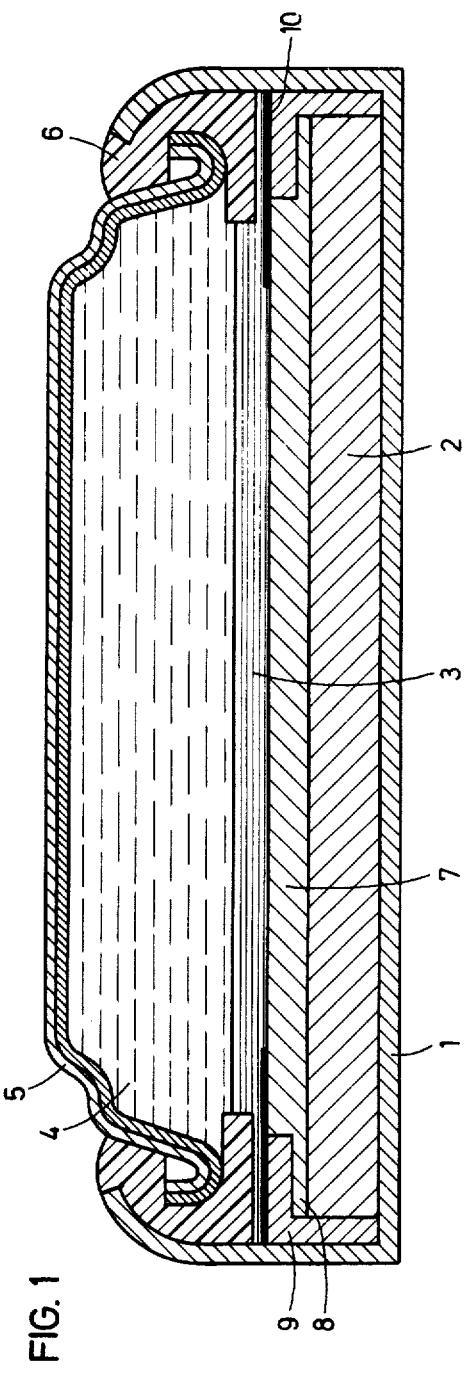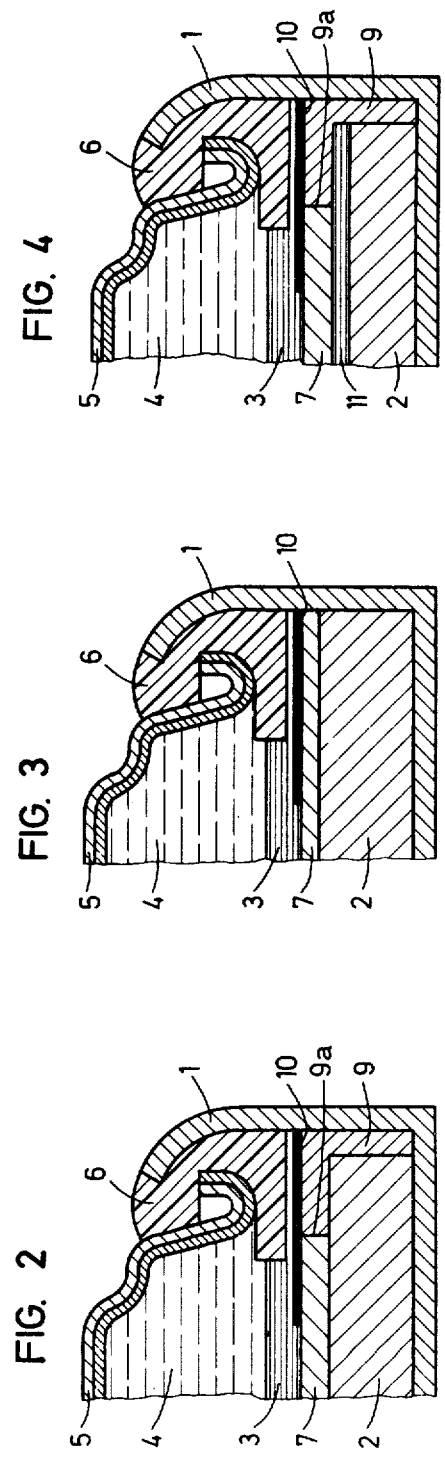

LONG-LIFE ALKALINE PRIMARY BATTERY

This invention relates to an alkaline primary battery of the type having a negative electrode containing cadmium or amalgamated zinc and a positive electrode containing monovalent silver oxide, mercuric oxide, or mixtures of these oxides with manganese dioxide, the positive electrode having an electrochemically active surface area facing the negative electrode.

It is a well-known fact that when alkaline primary batteries are stored or used for a very long time, self-discharge phenomena occur which reduce the stored capacity. These self-discharge phenomena are chemical processes which take place at the electrodes as so-called side reactions.

At negative electrodes, the evolution of hydrogen can be such a side-process. It occurs when the potential of the negative electrode is lower (i.e., more negative) than that of a hydrogen electrode in the same electrolyte. It is therefore observed on zinc electrodes, for example, and can be formulated as follows:

$$Zn + H_2O \rightarrow ZnO + H_2$$

The evolution of hydrogen leads to a loss of zinc, i.e., of negative active material. It can be arrested by keeping the hydrogen overvoltage of the zinc electrodes very high, e.g., by carefully excluding contaminants which reduce the overvoltage, or by means of additives to the electrode which increase the overvoltage, e.g., amalgamation.

At positive electrodes, self-discharge can be caused by the solubility of the active material. Even when this solubility in the electrolyte is but small, noticeable losses of capacity occur in time. Such a loss occurs, for instance, in the case of alkaline primary batteries having positive electrodes which contain monovalent silver oxide or mercuric oxide. In 5M KOH, the solubility of monovalent silver oxide and mercuric oxide is about $4.5 \times 10^{-4}$ moles of $Ag(OH)_2^-$ per liter and $3 \times 10^{-4}$ moles of $Hg(OH)_2$ per liter, respectively. The dissolved silver oxide or mercuric oxide diffuses through the separator layer disposed between the electrodes and finally reaches the negative electrode made, for example, of zinc or cadmium. The dissolved silver or mercury oxide is reduced as follows at the negative electrode:

$$Zn + 2 Ag(OH)_2^- \rightarrow ZnO + 2 Ag + H_2O + 2(OH)^-$$

$$Zn + Hg(OH)_2 \rightarrow ZnO + Hg + H_2O$$

$$Cd + 2 Ag(OH)_2^- \rightarrow Cd(OH)_2 + 2 Ag + 2(OH)^-$$

$$Cd + Hg(OH)_2 \rightarrow Cd(OH)_2 + Hg$$

Thus at the same time, a corresponding loss of negative active material, zinc or cadmium, occurs.

Instead of reacting with the negative electrode, the dissolved silver or mercury oxide may also react with organic substances in the separator system, in which case they are likewise reduced to the corresponding metals. This may give rise to short circuits which drastically accelerate the self-discharge.

It is an object of this invention to provide an improved alkaline primary battery designed to reduce this type of self-discharge brought about by the solubility of the positive active material, without impairing the internal resistance of the battery.

To this end, in the alkaline primary battery according to the present invention, the improvement comprises at least one electrically conductive, microporous, electrolytesaturated, optically opaque filter-electrode which covers the entire aforementioned active surface area of the positive electrode, contains either no monovalent silver oxide nor mercury oxide or only a substantially smaller amount thereof per unit of volume than the positive electrode, contains electrically conductive material which is not corroded, oxidized, nor dissolved in alkali electrolytes at the given potential of the positive electrode, and is in electrical contact with the positive electrode.

A plurality of filter-electrodes may also be disposed in alternation with separator layers.

Several preferred embodiments of the invention will now be described in detail with reference to the accompanying drawing, in which:

FIG. 1 is a cross-section through an alkaline button cell, and

FIGS. 2-4 are cross-sections through the outer zones of alkaline button cells.

The invention can also be applied analogously to other geometric configurations.

A tablet-shaped positive electrode 2 containing monovalent silver oxide or mercury oxide is accommodated in a cup 1 made of nickel, nickel-plated sheet steel, or another non-rusting nickel alloy, e.g., according to U.S. Pat. No. 3,673,000. The positive electrode 2 is separated from a negative electrode 4, consisting of finely divided amalgamated zinc or finely divided cadmium, by a separator layer 3 of polypropylene felt, polyethylene/methacrylic acid polymer, cellophane, cotton, or a similar combination of commercially available separator materials.

In the case of a negative electrode 4 of finely divided amalgamated zinc, a cover 5 bears on the inside a layer of copper, bronze, or another amalgamable metal having a high hydrogen overvoltage; the structure of the cover 5 is as described in U.S. Pat. No. 3,657,018. A sealing ring 6 of nylon, neoprene, or another synthetic material which is not attacked by potassium hydroxide or sodium hydroxide, and which exhibits as little cold flow as possible, is clamped between the cup 1 and the cover 5, the latter being resiliently deformed as disclosed in U.S. Pat. No. 3,657,018.

As illustrated in FIGS. 1-4, the galvanic cell according to the invention is provided with a metallically conductive, microporous filter-electrode 7. A rim 8 of this additional electrode 7 is in electrical contact with the housing cup 1 or with a supporting ring 9 disposed therein for the positive electrode 2.

The filter-electrode 7 contains electrically conductive material which, in the electrolyte used and at the given potential of the positive electrode 2, is neither corroded, oxidized, nor dissolved. For alkaline primary batteries containing monovalent silver oxide, mercury oxide, or mixtures thereof with manganese dioxide in the positive electrode, substances which enter into consideration as conducting material for the filter-electrode are graphite, nickel, and certain nickel alloys.

The filter-electrode 7 may also be a porous body made of organic or inorganic materials, the inner surfaces or pore-walls of which are metallized accordingly. Thus the filter-electrode 7 may consist of a metallized felt of synthetic fibers, e.g., nickel-plated plyester fibers, or it may be a pressed or sintered body of powdered inert metal oxide, e.g., $Cd(OH)_2$, $Al_2O_3$, or $ZrO_2$, the inner pore surface of which is coated with an electrically conductive layer.

The filter-electrode 7 may contain not only the aforementioned electrically conductive portion but also other non-conducting or semiconducting, inert fillers which are insoluble in the electrolyte and which affect the pore structure in such a way as to impede the diffusion of the monovalent silver oxide or mercury oxide dissolved in the electrolyte. Such additives are, for example, carbon black, manganese dioxide, thermally stabilized or decomposed manganese dioxide, activated carbon, cadmium hydroxide, magnesium oxide, etc.

Finally, the filter-electrode 7 may contain binders of an organic or inorganic nature which bind the electrically conductive portions, e.g., polyvinyl pyrrolidone, and also fillers which thicken the electrolyte, e.g., carboxymethyl cellulose.

The filter-electrode 7 is from 0.1 to 2 mm. thick and exhibits a porosity which is—as will be explained in detail below—adapted to the utilization. The porosity may be between 5% and 85% (fraction of the pore volume 0.05 to 0.85) The average pore diameter may be between 0.05 and 50 microns.

In any event, the filter-electrode 7 should not optically exhibit any translucent holes or pores. This clearly distinguishes the filter-electrode 7 from the structure of an electrically conductive network.

The filter-electrode 7 also has a completely different composition, structure, and function than the arrangement for electrodes made of divalent silver oxide described in U.S. Pat. No. 3,920,478, which discloses an oxidizable, open screen of a metal such as zinc intended to reduce the potential of the divalent silver oxide electrode. It is the very purpose of this oxidizable screen that it is supposed to be attacked and thereby reduces the divalent silver oxide. This screen is in no way intended to be a diffusion-inhibiting filter.

The same is true of German Disclosed Application (DOS) No. 2,525,360 filed on June 6, 1975 and laid open to public inspection on Dec. 18, 1975. It relates to the use of an oxidizable metal such as zinc, cadmium, lead, copper, or silver which is applied to a carrier grid in order to reduce the potential of the divalent silver electrode. It is to be noted in this connection that silver is considered to be oxidizable here because it is exposed to the electric potential of divalent silver oxide.

German Disclosed Application (DOS) No. 2,506,399, filed on Feb. 15, 1975 and laid open to inspection on Aug. 26, 1976, likewise relates to a galvanic cell having a positive electrode of divalent silver oxide; the purpose of the arrangement is to reduce the potential of the electrode to the value of a monovalent silver electrode. This is achieved in that the positive electrode of divalent silver oxide is superficially reduced and insulated from the positive contact can 1 by an electrically nonconductive layer of synthetic material, and the electrical contact to the positive contact can 1 takes place via a porous layer of silver. The porous layer of silver is not inert but oxidizable by the divalent silver oxide, and thus it likewise serves to reduce the potential. It is to be borne in mind in this connection that upon the discharge of silver oxide electrodes, metallic porous layers of silver are formed in any event, whether this is desired or not. In the case of electrochemical reduction, the porous layer of silver is initially formed chiefly at the edges of the contact ring. Therefore, the porous layer of silver formed does not serve the purpose of a non-oxidizable, diffusion-inhibiting filter-electrode which remains stable during a long period of storage, in the sense of the present invention.

The essential features of the present invention are that the filter-electrode does not contain any proportion (or at most only a substantially reduced proportion) of monovalent silver oxide or mercury oxide, that it is electrically conductive, that under the given conditions of electrolyte composition and potential it is not chemically or electrochemically attacked, oxidized, or dissolved, and that it covers the entire free surface area of the positive electrode facing the negative electrode. The invention also comprises an arrangement in which an additional separator layer is inserted between the filter-electrode 7 and the positive electrode 2. The additional separator layer of organic or inorganic material should be permeable to $OH^-$ ions but should retard the diffusion of dissolved monovalent silver oxide or mercury oxide into the filter-electrode. The additional separator layer may consist of oxidation-resistant, commercially available separator material, e.g., of polypropylene felt and methacrylic acid/polyethylene polymer, etc.

The following examples set forth the manner in which the filter-electrode may be produced. The examples relate to an alkaline mercury oxide/cadmium button cell 17.4 mm. in diameter and 7.5 mm. high. The positive electrode consisted of mercury oxide with an admixture of 5% powdered graphite and 9% manganese dioxide. The negative electrode consisted of sponge cadmium, the separators of the commercially available combination specified below.

EXAMPLE 1

A nickel wire netting having a mesh size of 0.4 mm. and a wire gauge of 0.1 mm. was immersed in a viscous paste of carbonyl-nickel powder, average grain size 2.6 to 3.4 microns, water, and a thickening agent such as gelatine, methyl cellulose, starch, etc., then dried and sintered at 900° C. for 15 minutes. The result was a highly porous (degree of porosity 0.85) sinter nickel plate 0.4 mm. thick, out of which discs 16 mm. in diameter were punched. The discs were pressed into the supporting ring 9 as filter-electrodes 7, as shown in FIG. 1, whereupon the rim portion 8 was compressed. The tablet 2 of mercuric oxide was then laid in place, and the entire assembly was pressed into the cup 1. The commercially available, microporous separators of synthetic nonwoven fabrik, polyethylene/methacrylic acid polymer, cellulose, and cotton were laid upon the sintered, porous filter-electrode 7. A plastic washer 10 of the synthetic resin polymer product sold under the registered trademark "Teflon" covered the peripheral portion of the filter-electrode 7. The cell was discharged at 75° C. across resistances of 1200 ohms. It was found that the separators were far less oxidized and that less dissolved mercury oxide diffused to the negative electrode than in cells without a filter-electrode.

EXAMPLE 2

A mixture of 99% finely divided graphite and 1% polyvinyl pyrrolidone as binder was pressed into a tablet 13 mm. in diameter and 0.4 mm. thick and inserted into a cell as the filter-electrode 7, as shown in FIG. 2. The filter-electrode 7 was in mechanical and electrical contact with the inner rim 9a of the supporting ring 9. As in Example 1, the separator layers 3 were disposed over the filter-electrode 7. Here again, after discharge at a high temperature (75° C.), it was found that the separators were practically not attacked. No trace of metallic mercury was found on the negative electrode. The filter-electrode had prevented the diffusion of dissolved mercury oxide.

EXAMPLE 3

A mixture of 50% finely divided graphite, 49% manganese dioxide which had previously been stabilized for 4 hours at 400° C., and 1% polyvinyl pyrrolidone as binder was pressed into a tablet and disposed as shown in FIG. 3. The manganese dioxide brought about a very fine-pored structure of the filter-electrode, which became very well wetted with alkaline electrolyte. After discharge at 75° C., metallic mercury was to be found neither on the separator layers nor in the cadmium electrode.

EXAMPLE 4

As illustrated in FIG. 4, a further separator layer 11 of electrically non-conductive material was inserted here between the filter-electrode 7 and the positive electrode 2. It consisted of a polypropylene felt lying upon the positive electrode and a diaphragm made of polyethylene/methacrylic acid polymer, which is sold under the trade name "Permion." The purpose of the additional separator layer 11 between the filter-electrode 7 and the positive electrode 2 was to impede still further the diffusion of mercury oxide dissolved in the electrolyte. The composition of the filter-electrode was 50% powdered graphite, 48.5% manganese dioxide, 1% polyvinyl pyrrolidone, and 0.5% carboxymethyl cellulose as a thickening agent for the alkali electrolyte. After discharge at 75° C., no mercury was detected on the surface of the filter-electrode facing the negative electrode.

The foregoing examples show that with the aid of the filter-electrode described, it is possible largely to prevent the diffusion of dissolved positive, active material to the negative electrode and to the separator layers. Thus both the earlier-mentioned loss of negative active material and the destruction of the separators by oxidation can be avoided.

Such filters are advantageous in HgO-Cd, HgO-Zn, Ag$_2$O-Cd, and Ag$_2$O-Zn cells.

The mode of operation of the additional filter-electrode may be physically described in the following manner. During discharge, the current distribution in the positive electrode adjusts itself in such a way that first that material to which the least electrical resistance leads is reduced. The electrical resistance is composed of the resistance of the ion flow in the electrolyte and the resistance of the electron flow in the electrically conductive portion of the positive electrode. By introducing the metallically conductive filter-electrode between the positive and negative electrodes, preferably that positive active material is first reduced which diffuses into the filter-electrode since the ohmic voltage drop to this reaction location is the smallest.

Based upon the example of a mercury oxide positive electrode and a 5M KOH electrolyte, it shall now be shown how the filter-electrode can be dimensioned so that no dissolved mercury oxide reaches the negative electrode.

The amount (m) of dissolved mercury oxide, Hg(OH)$_2$, diffusing into the filter-electrode per unit of time is roughly approximated by $$m = D \cdot (dc/dx) \cdot p \cdot (1/t) \cdot r^2\pi$$

and the corresponding reduction current which is needed to reduce this number of moles of Hg(OH)$_2$ per second in the filter-electrode is approximately $$i = 2F \cdot D \cdot (\Delta c/\Delta x) \cdot p \cdot (1/t) \cdot r^2\pi$$

wherein F = 96,500 coulombs, D is the coefficient of diffusion (cm$^2$/sec.) of dissolved Hg(OH)$_2$, $\Delta c/\Delta x$ is the linearized gradient of concentration in (moles/cm$^3$)/cm., p is the porosity (fraction of the pore volume), t is a tortuosity coefficient of the porous filter-electrode, and r is the radius of the filter-electrode. If D = 10$^{-5}$ cm$^3$/sec., $\Delta c = 3 \times 10^{-7}$ moles/cm$^3$, $\Delta x = 0.1$ cm., p = 0.5, (1/t) = 0.2, and r = 0.65, the result is a reduction current of $\approx 8 \times 10^{-7}$ amps. If the battery is constantly loaded with currents above this limit, then theoretically, according to this simplified calculation, no dissolved mercury oxide would reach the negative electrode or the separator, and the solubility of the mercury oxide contained in the positive electrode could not cause any loss of capacity at all.

By taking into consideration the electrolyte resistance in the pores of the filter-electrode, as well as the velocity of the electrochemical reaction.

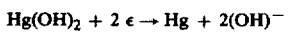

as a function of the local potential in the filter-electrode, which potential is determined by the ohmic voltage drop in the electrolyte-filled pores, differential equations could be set up by means of which a more exact current distribution in the filter-electrode would be computable. However, even the approximate calculation shows that the filter-electrode effectively reduces the self-discharge when batteries are loaded with low currents over a long period of use.

The smaller the pore diameter and the less the porosity, the more efffective the filter-electrode. The electrolyte resistance in the pores thereby increases, and the reduction takes place at a lower potential to an even greater extent in the filter-electrode. A higher internal resistance of the cell must naturally then be tolerated.

In the dimensioning of the filter-electrode, it must also be taken into account that the reduction of dissolved oxide brings about a deposition of metal which may reduce the porosity. In such cases, it may be advantageous not to bind the particles of the filter-electrode rigidly but rather to dispose them in the form of a more or less movable or flexible bed. The porosity should initially be great enough to allow for this factor.

In the case of open circuit storage, too, the filter-electrode aids in lessening the diffusion of dissolved monovalent silver oxide or mercury oxide since the concentration gradient must develop over a longer distance, and the rate of diffusion is slowed by the described measures in the filter-electrode. The hydrogen produced by the self-discharge of negative zinc electrodes can diffuse to the filter-electrode and there serve as an electrochemical reducing agent for the dissolved monovalent silver oxide or the dissolved mercury oxide. Organic components of the separator may also dissolve in traces in the electrolyte and penetrate into the filter-electrode, where they may serve as reducing agents for the dissolved silver or mercury oxides. These side-reactions can contribute to ensuring that during open circuit storage, less dissolved silver oxide or mercury oxide reaches the negative electrode, where it would cause the aforementioned self-discharge.

What is claimed is:

1. In an alkaline primary battery of the type having a negative electrode containing cadmium or amalgamated zinc and a positive electrode containing monovalent silver oxide, mercuric oxides or mixtures of these oxides with manganese dioxide, the positive electrode having an electrochemically active surface area facing said negative electrode, said primary battery comprising at least one electrically conductive, microporous, electrolyte saturated, optically opaque filter electrode which covers the entire said electrochemically active surface area of said positive electrode, said filter electrode containing electrically conductive material which is not corroded, oxidized nor dissolved in alkali electrolytes at the given potential of said positive electrode and is in electrical contact with said positive electrode, wherein said filter electrode contains, in addition to said conductive material, a very finely divided, surface-rich second substance which is insoluble in alkali electrolytes and is not attacked or dissolved at the potential of said positive electrode.

2. An alkaline primary battery in accordance with claim 1, wherein said substance is carbon black.

3. An alkaline primary battery in accordance with claim 1, wherein said substance is activated carbon.

4. An alkaline primary battery in accordance with claim 1, wherein said substance is manganese dioxide.

5. An alkaline primary battery in accordance with claim 1, wherein said substance is cadmium hydroxide.

6. An alkaline primary battery in accordance with claim 1, wherein said substance is nickel hydroxide.

7. An alkaline primary battery in accordance with claim 1, wherein said substance is aluminum oxide.

* * * * *